F. S. PERRIN.
ELECTRICAL TRANSFORMER SYSTEM.
APPLICATION FILED SEPT. 25, 1913.
1,156,035.
Patented Oct. 5, 1915.
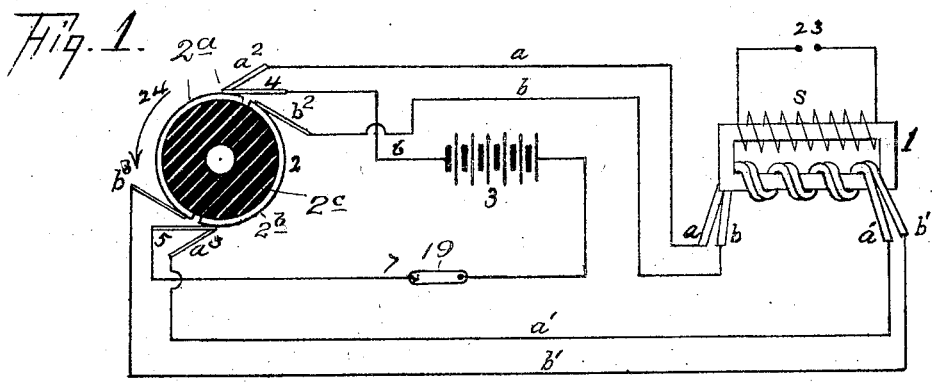
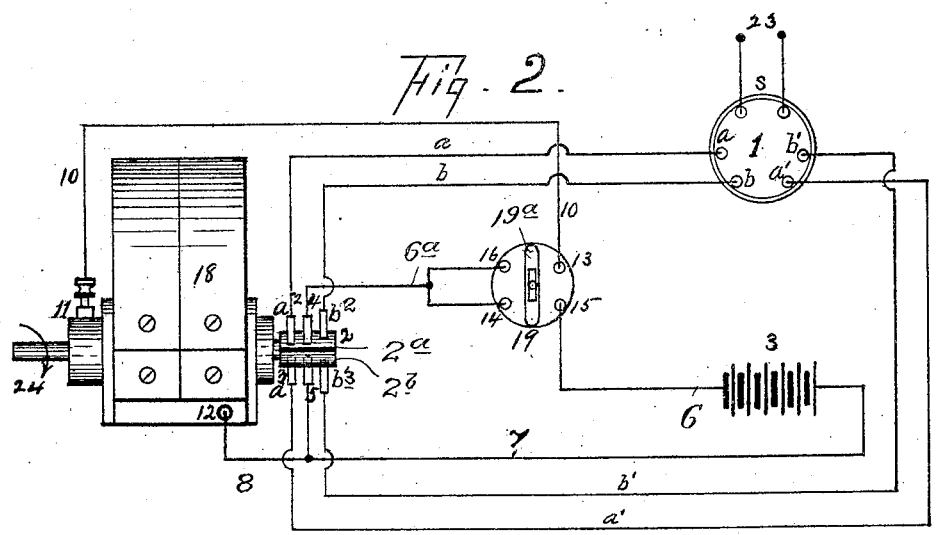
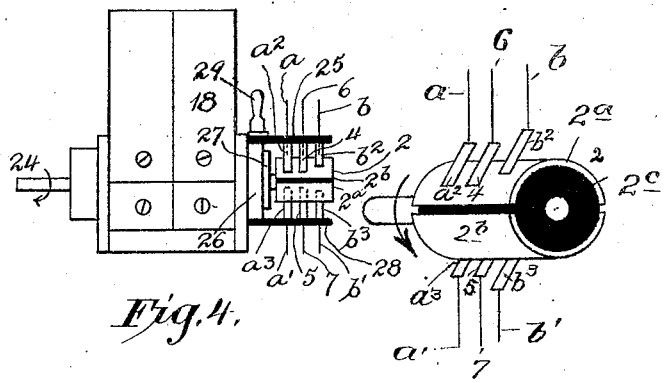
WITNESSES:
INVENTOR
F. S. Perrin
BY T. F. Bourne
his ATTORNEY

UNITED STATES PATENT OFFICE.

FREDERIC S. PERRIN, OF NEW YORK, N. Y., ASSIGNOR TO SPLITDORF ELECTRICAL CO., OF NEWARK, NEW JERSEY, A CORPORATION OF NEW JERSEY.

ELECTRICAL TRANSFORMER SYSTEM.

1,156,035.   Specification of Letters Patent.   Patented Oct. 5, 1915.

Application filed September 25, 1913. Serial No. 791,710.

*To all whom it may concern:*

Be it known that I, FREDERIC S. PERRIN, a citizen of the United States, and resident of New York city, borough of Brooklyn, in the county of Kings and State of New York, have invented certain new and useful Improvements in Electrical Transformer Systems, of which the following is a specification.

My invention relates to improvements in electric transformer or induction systems, and the objects of my invention are to abolish the customary make and break in the primary coil circuit, enabling the elimination of the platinum points commonly used at the break of the primary circuit, and to cause the primary circuit to divide in parallel for a period, and to then reverse one such divided circuit in such manner as to momentarily and suddenly annihilate both such circuits, and to then restore such parallel circuits, and so on alternately causing the flow of the current in parallel and in reverse directions in the primary winding.

In the accompanying drawings I have illustrated systems whereby I attain the aforesaid objects, wherein, Figure 1 is a partly sectional and diagrammatic view illustrating my improvements, in which a battery is used as a source of energy for the primary circuit of the transformer; Fig. 2 is a view illustrating a low tension magneto generator and a battery, in conjunction with the transformer and suitable circuits, enabling the use of either such generator at will, Fig. 3 is an isometrical view of the circuit controller illustrated in Figs. 1 and 2. Fig. 4 is a side view illustrating means movably supporting the brushes, and Fig. 5 is a detail side view thereof.

Similar numerals of reference indicate corresponding parts in the several views.

The numeral 1 indicates a transformer or induction coil having two primary wires $a, b$, wound in parallel and together throughout the primary winding with respect to the soft iron core of the transformer or induction coil and the secondary coil $s$ thereof, which has its terminals as indicated at 23.

2 indicates a cylinder having two equal metal segments $2^a, 2^b$, shown separated and insulated from each other by being mounted upon suitable insulation $2^c$, to which such segments are secured. Brushes $a^2, b^2$ are connected with corresponding terminals of winding wires, $a, b$, the opposite terminals $a', b'$ of which are respectively connected with brushes $a^3, b^3$, which brushes are adapted to bear on the segments $2^a, 2^b$. The opposite terminals of battery 3 are respectively connected with brushes 4, 5, through the conductors 6, 7, which brushes are adapted to bear upon segments, $2^a, 2^b$, the brushes $a^2$ and 4, as well as the brushes $a^3$ and 5, respectively on opposite sides of cylinder 2, being shown located in substantial alinement along said cylinder, while the brushes $b^2$ and $b^3$, which are respectively adjacent to the brushes $a^2$, 4, and $a^3$, 5, are located somewhat in advance of the corresponding brushes $a^2$, 4 and $a^3$, 5, with respect to the direction of rotation of cylinder 2.

With the cylinder 2 in one position, such as shown in Fig. 3, the brushes $a^2$, 4 and $b^2$ will bear upon one segment, such as $2^a$, and the brushes $a^3$, 5 and $b^3$ will bear upon the other segment of the cylinder, such as $2^b$, thereby causing circuit from the battery to divide in parallel through the transformer parallel windings $a, b$, such segments then being charged with current of opposite polarity, whereby, for instance, positive current from the battery will flow through conductor 7 and brush 5 to segment $2^b$, and will then divide and pass in parallel through the brushes $a^3, b^3$ and the primary windings $a, b$, of the transformer, and thence through the brushes $a^2$ and $b^2$ to the segment $2^a$ of the cylinder, and thence through the brush 4 to the opposite terminal of the battery, thus completing the circuit of the battery through the primary parallel windings of the transformer in the same direction in both wires of the winding, thus creating a magnetic field in the transformer. Such condition will continue until cylinder 2 is rotated sufficiently far to cause the brushes $b^2$ and $b^3$ to pass out of contact with the segments $2^a, 2^b$ respectively, of the cylinder, into contact with the segments $2^b, 2^a$ respectively approaching such brushes, while the brushes $a^2$, 4 and $a^3$, 5, respectively, remain in circ[uit] with the segments $2^a, 2^b$, as illustrated in the position represented in Fig. 1. At such moment (since the brushes $b^2, b^3$ are set ahead of the others), a change in the direction of the flow of current in one of the transformer primary windings will occur, thus causing a current of opposite polarity or direction to pass through such winding of the transformer primary winding from that which has been passing therethrough, without changing the direction or polarity of the current still passing through the other winding of the primary of the transformer. As, for instance, with the parts in the position shown in Fig. 1, the current from the battery will continue to flow through the winding $a$ in the same direction as before described while the current from the battery will be caused to pass through 7, 5, $2^b$, $b^2$ and winding $b$ of the primary of the transformer, thence through $b'$, $b^3$, $2^a$, 4 and 6 to the opposite terminal of the battery, the current at such moment thus flowing in opposite directions through the parallel primary winding of the transformer, and will instantly annihilate the magnetic field, which will induce a secondary current in the secondary winding of the transformer, in manner similar to the breaking of the primary circuit in ordinary transformers at the present time having a single primary winding. As cylinder 2 now continues to rotate in the direction of the arrows, the brushes 4, $a^2$ and 5, $a^3$ will be engaged by the segments $2^b$ and $2^a$ respectively, on which the brushes $b^2$ and $b^3$ then remain, thereby again restoring the brushes $b^2$, 4, $a^2$ to contact with one segment $2^b$, and the brushes $b^3$, 5, $a^3$ to contact with the other segment $2^a$, and thereupon the current from the battery will flow in the same direction through the two parallel windings $a$, $b$, of the transformer in parallel, as before described, until the cylinder has again rotated sufficiently far to cause the brushes $b^2$ and $b^3$ to pass to the next advancing segments, while the brushes $a^2$, 4 and $a^3$, 5 remain upon their corresponding segments, again causing reversal of the current in primary winding $b$, and so on, alternately causing the current to flow through the windings $a$, $b$, in parallel and in reverse directions during rotation of cylinder 2.

It will be understood by those conversant with the art that to produce a secondary current of high potential in a transformer a primary current of low potential must create a magnetic field in the transformer, and that such magnetic field must be destroyed instantly to produce a current in the secondary winding. The usual manner of destroying such magnetic field has been to break or open the primary circuit, but in doing so an arc is formed at the break, caused by the self-induction of the primary coil. Such arc is very destructive to the points at the break, and to insure a longer life to such points they are generally tipped with platinum at relatively high cost. By means of my invention I eliminate the arc caused by self-induction of the primary coil and am enabled to eliminate the use of platinum or other points liable to destruction, since no arc is formed at the brushes of the circuit controller I have described.

In Fig. 2 I have illustrated a low tension magneto generator 18 capable of use in the system with the battery 3, so that either of such generators may be used at will. To this end I provide the following arrangements. A suitable switch 19 is adapted to direct the current from either the battery 3 or the magneto 18 through the primary windings $a$, $b$, of the transformer, but which, it is understood, is wound with the parallel wires $a$, $b$, as illustrated in Fig. 1, and is shown in a tube, with the secondary terminals 23 exposed. The low tension magneto 18 illustrated is one of the usual types on the market, having an armature revolving in a magnetic field produced by permanent magnets, and wherein the inner end of the armature winding is grounded on the armature shaft and the outer end of such winding is connected to an insulated ring fastened to the armature shaft in a usual way, the current produced by the armature being collected by a brush 11 resting upon said ring, a wire 8 being connected to ground 12 on the magneto and to brush 5. In the switch 19 the contact 15 is connected with one terminal of battery 3 by wire 6, and the brush 5 is common to the other terminal of the battery, and to the ground terminal 12 of the magneto, as by the wire 8. The line 10 of the brush 11 of the magneto armature is connected with the contact 13 of switch 19. Contacts 14 and 15 of said switch are shown connected by line $6^a$ with brush 4. The cylinder 2 with its metal segments $2^a$, $2^b$ and the brushes $a^2$, 4, $b^2$ and $a^3$, 5, $b^3$ are arranged similarly to that described with respect to Figs. 1 and 2, said cylinder being secured to the magneto shaft.

If the switch lever or arm $19^a$ is moved to bridge across between contacts 15 and 16 the magneto primary circuit is opened and the battery circuit is closed with the transformer 1, and upon rotation of the armature shaft in the direction of the arrow 24 in Fig. 2, the operation and result will be identical to that described with respect to Fig. 1. If the lever $19^a$ be bridged across between the contacts 13 and 14 the aforesaid battery circuit will be opened at 15 and the primary magneto circuit closed through line 10, brush 11, the armature winding, ground 12, wire 8, brush 5, lower segment ($2^b$) of cylinder 2, brushes $a^3$, $b^3$ (in the position of cylinder 2 shown in Fig. 2), thence through the windings $a$, $b$, of the transformer to the brushes $a^2$, $b^2$, upper segment $2^a$ and through brush 4 and line $6^a$ to contact 14, thence through $19^a$ to 13. With the cylinder 2 in the position shown in Fig. 2, it will be understood that the current from the magneto primary, passing to the upper and lower segments of the cylinder, divides through the brushes $a^2$, $b^2$, and $a^3$, $b^3$, and thus through the transformer windings $a$, $b$, in parallel, and such flow of the current will continue while the brushes $a^2$, 4, $b^2$ are on one segment and the brushes $a^3$, 5, $b^3$ are on the other segment of the cylinder. When cylinder 2 is moved in the direction of the arrow 24, the brushes $b^2$ and $b^3$ being set in advance of the others, will first pass from the segments $2^a$, $2^b$ to the segments $2^b$, $2^a$ respectively, while the brushes $a^2$, 4 and $a^3$, 5 still remain in contact with the segments $2^a$, $2^b$ respectively, and will thereby cause a reverse current to pass through the coil $b$ momentarily, and thereby annihilate the magnetic field in the transformer, thereby causing a secondary current of high tension to be induced in the secondary coil $s$ producing a spark at its terminal 23. As the cylinder 2 continues to rotate, the brushes $a^2$, 4 come in contact with the segment upon which the brush $b^2$ rests, and the brushes $a^3$, 5 come in contact with the segment upon which the brush $b^3$ rests, and the current will then flow through both windings $a$, $b$, in parallel until the brushes $b^2$, $b^3$ again pass from such segments to the advancing segments, whereby reversal of current in winding $b$ will again occur, and so on, the current reversing in one of the parallel windings $a$, $b$, each time the segments shift from the brushes $b^2$, $b^3$.

By means of switch 19 and the connections shown in Fig. 2, either battery 3 or the magneto 18 may be used to furnish the primary current for operating the transformer, and to operate the same without any sparks or arcs whatever at the segments on the cylinder. By mounting the brushes so as to be rotated or rocked around cylinder 2 the time of the discharge of the sparks at the terminals 23 may be advanced or retarded in an ordinary manner.

As shown in Figs. 4 and 5 the brushes $a^2$, $b^2$ and 4 are secured upon insulation 25 carried by a ring 26, which is mounted to rock or rotate upon the sleeve or hub 27 of the magneto, and the brushes $a^3$, $b^3$ and 5 are secured upon insulation 28 carried by ring 26. An arm 29 secured to ring 26 may be connected with suitable operating means. When ring 26 is rocked or rotated the position of the brushes will be changed with respect to the segments $2^a$, $2^b$ for advancing or retarding the discharge of sparks at the terminals.

Having now described my invention what I claim is:—

1. A transformer having a primary winding comprising two parallel wires, and means for temporarily reversing the direction of the current in one of said wires while the current continues in the original direction in the other wire.

2. A transformer having a primary winding comprising two parallel wires, means for temporarily reversing the direction of the current in one of said wires, and a secondary winding adjacent said parallel wires while the current continues in the original direction in the other wire.

3. A transformer having primary and secondary windings adjacent to one another, the primary winding comprising a plurality of parallel wires, and means for temporarily changing the direction of the current through one of the parallel primary wires while the current continues in the original direction in the other wire to nullify the effect of the primary winding in the magnetic field.

4. The combination of a transformer having a primary winding comprising a plurality of parallel wires, with a generator, and means for directing the flow of current from said generator in parallel through said wires, and for temporarily reversing the direction of the current through one of said wires while the current continues to the original direction in the other wire.

5. The combination of a transformer having a primary winding comprising a plurality of parallel wires, with a generator, and means for directing the flow of current from said generator continuously in one direction through one of said wires and alternately in opposite directions through another of said wires while the current continues to the original direction in the other wire.

6. The combination of a transformer having a primary winding comprising a plurality of parallel wires, with a generator, a plurality of separate segments, brushes to coact with said segments and in circuit with the terminals of said generator respectively, brushes connected with the terminals of said parallel primary windings and adapted to coact with said segments, the brushes of one of said primary wires being adapted to engage one of the segments while the brushes of another primary winding engage different segments.

7. The combination of a transformer having a primary winding comprising a plurality of parallel wires, with a generator, a plurality of separate segments, brushes to coact with said segments and in circuit with the terminals of said generator respectively, and brushes connected with the terminals of said parallel primary windings and adapted to coact with said segments the brushes of one of the primary wires being located in advance of the brushes of another of said primary windings with respect to the rotation of said segments.

8. The combination of a transformer having a primary winding comprising a plurality of parallel wires, with a generator, a plurality of separate segments, brushes to coact with said segments and in circuit with the terminals of said generator respectively, and brushes connected with the terminals of said parallel primary windings and adapted to coact with said segments, the brushes of one of the primary wires being located in advance of the brushes of another of said primary windings with respect to the rotation of said segments, the brushes of the generator being adapted to bear upon the same segments as the brushes of one of said primary windings while the brushes of another of said primary windings are upon different segments.

9. The combination of a transformer having a primary winding comprising a plurality of parallel wires, with a generator, a plurality of separate segments, brushes to coact with said segments and in circuit with the terminals of said generator respectively at opposite sides of said segments, and brushes connected with the terminals of said parallel primary windings and adapted to coact with said segments, the brushes of one of the primary windings and adjacent brushes of the generator respectively on opposite sides of the segments being in substantial alinement with each other with respect to said segments, to always simultaneously bear upon the corresponding segment, and the brushes of the other primary winding being located in advance of adjacent brushes of the other primary winding and generator with respect to the direction of rotation of said segments.

10. The combination of a transformer having a primary winding comprising a plurality of parallel wires, with a battery and a magneto, and means for permitting the flow of current from the battery and the magneto alternately at will continuously in one direction through one of said wires, and alternately in opposite directions through another of said wires.

11. The combination of a transformer having a primary winding comprising a plurality of parallel wires, with a battery and a magneto, segments rotated with the magneto armature, adjacent brushes connected with the parallel windings of the transformer and adapted to coact with said segments, the adjacent brushes of corresponding terminals of said primary windings being one in advance of another with respect to the rotation of said segments and located on opposite sides thereof respectively, a switch having terminals respectively connected with a terminal of the battery and of the magneto, a brush associated with brushes of corresponding terminals of the primary windings and connected with terminals of the switch and adapted to coact with said segments, and a brush connected with terminals of the battery and the magneto and associated with other brushes of the terminals of the primary windings.

Signed at New York city, in the county of New York, and State of New York, this 19th day of September, A. D. 1913.

FREDERIC S. PERRIN.

Witnesses:
T. F. BOURNE,
MARIE F. WAINRIGHT.

Copies of this patent may be obtained for five cents each, by addressing the "Commissioner of Patents, Washington, D. C."